US012278565B2

United States Patent
Schulz

(10) Patent No.: US 12,278,565 B2
(45) Date of Patent: Apr. 15, 2025

(54) METHOD FOR REGULATING A BUCK-BOOST CONVERTER HAVING TWO SWITCHING ELEMENTS AND AN INDUCTANCE AND VIA WHICH AN INPUT VOLTAGE IS CONVERTED INTO REGULATED OUTPUT VOLTAGE

(71) Applicant: Siemens Aktiengesellschaft, Munich (DE)

(72) Inventor: Stefan Schulz, Gnadendorf (AT)

(73) Assignee: Siemens Aktiengesellschaft, Munich (DE)

( * ) Notice: Subject to any disclaimer, the term of this patent is extended or adjusted under 35 U.S.C. 154(b) by 251 days.

(21) Appl. No.: 17/922,006

(22) PCT Filed: Apr. 16, 2021

(86) PCT No.: PCT/EP2021/059891
§ 371 (c)(1),
(2) Date: Oct. 28, 2022

(87) PCT Pub. No.: WO2021/219401
PCT Pub. Date: Nov. 4, 2021

(65) Prior Publication Data
US 2023/0216408 A1 Jul. 6, 2023

(30) Foreign Application Priority Data
Apr. 28, 2020 (EP) .................... 20171701

(51) Int. Cl.
*H02M 3/158* (2006.01)
*H02M 1/00* (2006.01)
(52) U.S. Cl.
CPC ....... *H02M 3/1582* (2013.01); *H02M 1/0003* (2021.05)

(58) Field of Classification Search
CPC ..... G05F 1/00; G05F 1/10; G05F 1/12; G05F 1/46; G05F 1/455; G05F 1/45;
(Continued)

(56) References Cited

U.S. PATENT DOCUMENTS 6,166,527 A    12/2000   Dwelley
10,063,146 B1 *   8/2018   Lee ..................... G01R 19/003
(Continued)

FOREIGN PATENT DOCUMENTS

EP     2479878     7/2012

OTHER PUBLICATIONS

PCT International Search Report and Written Opinion of International Searching Authority mailed Jul. 6, 2021 corresponding to PCT International Application No. PCT/EP2021/059891 filed Apr. 16, 2021.
(Continued)

*Primary Examiner* — Jeffrey A Gblende
*Assistant Examiner* — Nusrat Quddus
(74) *Attorney, Agent, or Firm* — Cozen O'Connor

(57) ABSTRACT

A clocked buck-boost converter includes two switch elements and an inductor and via which an input voltage is converted into a regulated output voltage, wherein a first switch element or buck converter switch element is clocked using a first control signal, and a second switch element or boost converter switch element is clocked using a second control signal, where the first and second control signals are derived from a regulator manipulated variable from a regulating unit, first and second manipulated variables are generated for the first and second control signals, the regulator manipulated variable is amplified, an offset value is derived, and the two manipulated variables are then compared with a sawtooth signal and the two switch elements of the buck-boost converter are actuated or clocked in a corre-
(Continued)

sponding manner to generate the first or second control signal.

15 Claims, 4 Drawing Sheets

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/158; H02M 3/1588; H02M 2003/1566; H02M 3/1582; H02M 2003/1557; H02M 3/1584; H02M 3/285; H02M 3/33561; H02M 7/49; H02M 1/045; H02M 7/006; H02M 7/06; H02M 7/068; H02M 7/153; H02M 7/10; H02M 1/088; H02M 7/103; H02M 7/106; H02M 7/19; H02M 7/08; H02M 7/17; H02M 2001/007; H02M 7/493; H02M 7/53806; H02M 7/5381; H02M 7/483; H02M 7/217; H02M 7/538466; H02M 7/5387; H02M 7/53871; H02M 7/53873; H02M 7/53875; H02M 1/084; H02M 1/0845; H02M 3/07; H02M 3/073; H02M 2003/071; H02M 2003/072; H02M 2003/075; H02M 2003/076; H02M 2003/077; H02M 2003/078; H02M 2001/0048; H05B 39/048; B23K 11/24; H04B 2215/069; H02J 3/46; H02J 3/38
See application file for complete search history.

(56) References Cited

U.S. PATENT DOCUMENTS

| | | | |
|---|---|---|---|
| 11,502,607 B2 * | 11/2022 | Babazadeh | H02M 3/1566 |
| 2010/0277142 A1 * | 11/2010 | Tan | H02M 7/53803 |
| | | | 323/268 |
| 2014/0125306 A1 * | 5/2014 | Babazadeh | G05F 5/00 |
| | | | 323/285 |
| 2018/0340964 A1 * | 11/2018 | Ranucci | G01R 19/0092 |
| 2019/0131876 A1 * | 5/2019 | Luff | H02M 1/08 |

OTHER PUBLICATIONS

Chen, Yaow-Ming et al. "Progressive smooth transition for four-switch buck-boost converter in photovoltaic applications", Energy Conversion Congress and Exposition (ECCE); IEEE; pp. 3620-3625, 2011.

Keskin, Ridvan et al. "Design of Non-Inverting Buck-Boost Converter for Electronic Ballast Compatible with LED Drivers", arxiv.org, Cornell University Library; 2019.

Lee, Hyeon-Seok et al. "High-Efficiency Bidirectional Buck-Boost Converter for Photovoltaic and Energy Storage Systems in a Smart Grid", IEEE Transactions on Power Electronics, Institute of Electrical and Electronics Engineers, vol. 34, No. 5, pp. 4316-4328, 2019.

* cited by examiner

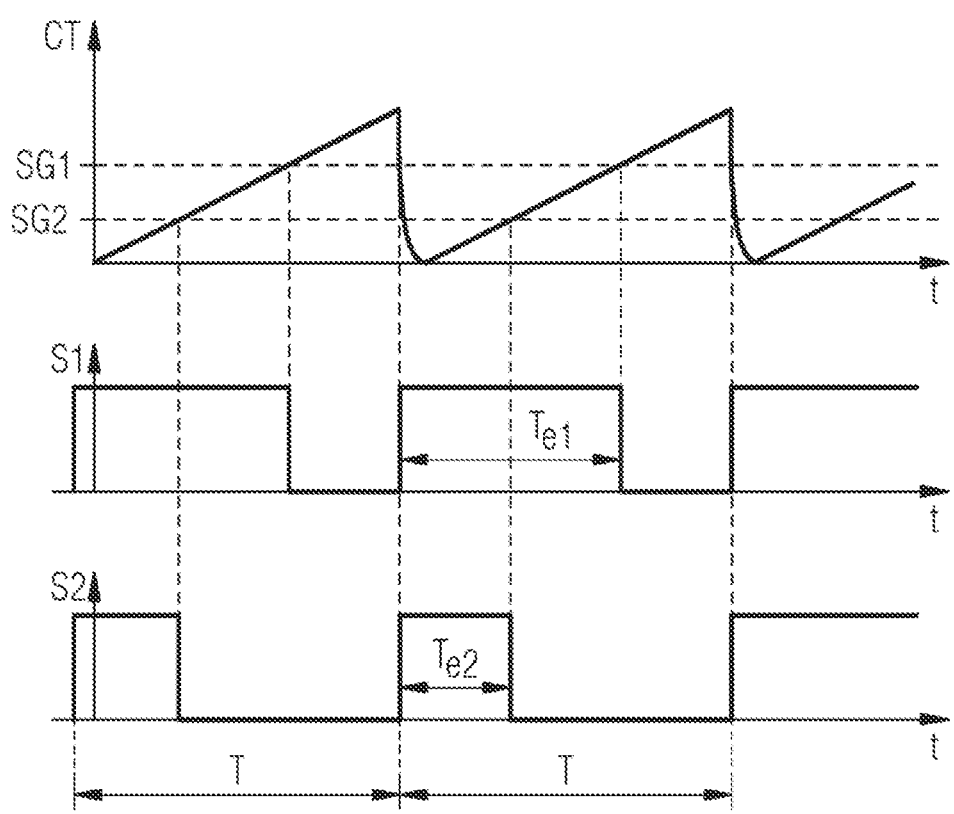

METHOD FOR REGULATING A BUCK-BOOST CONVERTER HAVING TWO SWITCHING ELEMENTS AND AN INDUCTANCE AND VIA WHICH AN INPUT VOLTAGE IS CONVERTED INTO REGULATED OUTPUT VOLTAGE

CROSS-REFERENCE TO RELATED APPLICATIONS

This is a U.S. national stage of application No. PCT/EP2021/059891 filed 16 Apr. 2021. Priority is claimed on European Application No. 20171701.4 filed 28 Apr. 2020, the content of which is incorporated herein by reference in its entirety.

BACKGROUND OF THE INVENTION

1. Field of the Invention

The substantive invention generally concerns the field of electrical engineering, in particular the area of power electronics and power electronic circuits and, more specifically, relates to a method for regulating a DC-DC converter, in particular a clocked buck-boost converter, which has two switching elements and an inductance or inductor and via which an input voltage is converted into a regulated output voltage, where a first switching element assigned to a buck converter part of the buck-boost converter is clocked by a first control signal and a second switching element assigned to a boost converter part of the buck-boost converter is clocked with a second control signal, and where the first control signal and also the second control signal are derived from a regulator manipulated variable which is made available by a regulator unit for regulating the output voltage of the buck-boost converter and which defines a switched-on duration of the first and second switching elements.

2. Description of the Related Art

In many areas, such as automation of the industrial sector, automotive sector, switched-mode power supplies or switchgear are being used nowadays as power supply for, e.g., control devices, electronic devices, and/or drives, in installations or the like. They are primarily used to link a load or a consumer (e.g. drive, motor, control device, etc.) to an electricity grid or a power source, such as a battery, and to supply it with a usually constant and often predefined voltage. Therefore, a switched-mode power supply converts an usually unstabilized input voltage, which usually originates as DC or AC voltage from a power source, into a constant output voltage for supplying the load or the consumer. Here, constancy of the output voltage and/or of the output current is attained by control and regulation of the energy flow into the switched-mode power supply or into the load.

There are various embodiments of switched-mode power supplies, depending on requirements. For linking to an AC voltage grid or an AC voltage source, for example, it is possible to perform rectification of the grid voltage in the switched-mode power supply. In order to convert the rectified input voltage or an unstabilized or fluctuating DC voltage into a constant output voltage, use is usually made of "DC-DC converters. The latter may, for example, also be used as filters, primarily in high-power applications, and/or for active power factor correction (PFC) in switched-mode power supplies. It is thereby possible to minimize, e.g., negative influences on the electricity grid caused by the switched-mode power supply, "grid perturbations".

A DC-DC converter usually constitutes an electrical circuit that converts a (usually unstabilized) DC voltage (e.g., a rectified AC voltage, and/or DC voltage from a battery module) fed in at the input into a DC voltage at the output. This DC voltage at the output of the converter or this output voltage may have a voltage level lower than, equal to or higher than that of the voltage fed in at the input or the input voltage. The conversion of the input voltage into the usually predefined output voltage is normally effected with the aid of at least one periodically operating switching element (e.g., semiconductor switching element) and an energy store, which in the case of "inductive converters" can be formed as an inductance (e.g., coil, inductor, transformer), for example. In contrast thereto, converters with capacitive storage (capacitive converters) are referred to as charge pumps.

One example of a DC-DC converter that can supply an output voltage greater than, equal to and/or less than an input voltage (depending on the application) is a buck-boost converter, also referred to as a step-down/up converter. In the case of the buck-boost converter, for example, a boost converter or step-up converter is connected downstream of a buck converter or step-down converter. Here, both the buck converter and the boost converter each have at least one switching element and share a common energy store, formed as an inductance or coil. One exemplary circuit of a buck-boost converter is illustrated, e.g., schematically in the upper part of FIG. 1.

Buck-boost converters are primarily used in the case of fluctuating input voltages (e.g., rectified AC voltage having ripple or residual ripple). The conversion of the input voltage into a regulated output voltage can be effected in a continuous mode with a fixed switching frequency or in a discontinuous mode or discontinuous conduction mode (DCM) of the buck-boost converter.

In the case of the continuous mode with a fixed switching frequency, e.g., the switching elements of the buck-boost converter are switched with a fixed number of switch-on and switch-off processes per time interval. This has the disadvantage, primarily at higher input and/or output voltages, that the switching elements are not switched on at the optimum point in time and that high switching losses and high emitted interference (e.g., in the form of noises and/or electromagnetic radiation, i.e., EMC interference) may occur as a result of the fixed-frequency driving. The document Ridvan, Keskin et al. "Design of Non-Inverting Buck-Boost Converter for Electronic Ballast Compatible with LED Drivers", Cornell University Library, New York, April 2019, discloses, for example, a circuit for a non-inverting buck-boost converter in the continuous mode as a load for an LED drive.

In the case where the input voltage is converted into a regulated output voltage in the discontinuous mode or discontinuous conduction mode (DCM) of the buck-boost converter, for example, the respective switching element is switched on after the inductance of the buck-boost converter has been demagnetized. A dead time occurs as a result. In the case of fixed-frequency driving of the switching elements in the discontinuous mode, high switching losses can likewise occur if parasitic capacitances contained, e.g., in the switching elements (e.g., field effect transistors) and in inductances (e.g., inductors, transformers) are charged to correspondingly high voltages before a next switch-on time. In the case where a switching element is switched on in the next clock cycle, these parasitic capacitances are discharged or subjected to charge reversal, e.g., via the switching element (e.g., transistor) and in the process, depending on the voltage present, generate current spikes of greater or lesser magnitude, which at correspondingly high voltage lead to correspondingly high switching losses.

In order to minimize these switching losses, particularly at high input and output voltages, for example, "quasi-resonant switching" or "valley switching" of the switching elements of the buck-boost converter may be striven for. In the case of quasi-resonant switching, for example, via a recognition circuit, a minimum (also called "valley") of the voltage at at least one switching element of the converter is recognized and the at least one switching element is only switched on at this point in time. The parasitic capacitance is discharged to the minimum voltage. In this way, the switching-on current spike is minimized and a reduction of the switching losses and of the emitted interference is achieved. Quasi-resonant driving requires corresponding driving of the switching elements with a common, variable switching frequency, but different switched-on durations, which are predefined by corresponding control signals.

Furthermore, a buck-boost converter can be operated in different operating modes depending on a ratio between input voltage and output voltage. If the input voltage is, e.g., significantly greater than the output voltage, the buck-boost converter is usually only operated in the buck converter mode or buck mode. That is, in this mode only the switching element of the buck converter is switched, while the switching element of the boost converter remains switched off in a constant manner. If a difference voltage between input voltage and output voltage of the buck-boost converter falls below a certain minimum value, for example, then the buck-boost converter is normally operated in the "mixed mode". That is, both the switching element of the buck converter and the switching element of the boost converter are switched with an identical switching frequency, but different switched-on durations.

The output voltage of the buck-boost converter can be regulated to a predefined value via a superordinate regulating circuit, for example, which may contain, e.g., at least one pulse width modulator, where the duty cycle can be changed for regulation purposes. A transfer ratio between the input voltage and output voltage can be varied depending on the duty cycles of the switching elements. That means that the buck-boost converter is normally regulated via a suitable setting of the duty cycles of the control signals for the switching elements and/or switched-on durations of the switching elements, where influences such as a variable or fluctuating input voltage, load changes, and/or component variances, must be taken into account. Furthermore, a transition between the operating modes, e.g., from the buck converter mode to the mixed mode or from the mixed mode to the buck converter mode, can, owing to discontinuities, also lead to disturbances and losses during the regulation, which can have disadvantageous effects on the overall system, i.e., buck-boost converter and superordinate regulating circuit.

EP 2 479 878 B1 discloses an exemplary method for regulating a buck-boost converter. This method involves detecting a current in the switching element of the buck converter or in the buck converter switching element and regulating the buck converter switching element such that after demagnetization of the inductance or the inductor, i.e., in the discontinuous mode of the buck-boost converter, an unambiguous resonance state exists that enables quasi-resonant switching.

In the case of quasi-resonant switching or valley switching, the switching elements of the buck-boost converter are usually switched on simultaneously at a minimum (also called "valley") of the voltage at the switching elements in order (particularly at high input and output voltages) to keep down or minimize switching losses and electromagnetic interference. The minima in the voltage profile at the switching elements of the converter can be recognized, e.g., via a recognition circuit. Switching on during a valley causes constant resetting of the period beginning (pulse reset) and thus adaptation of the switching frequency.

That means that in the case of the regulating method for a buck-boost converter disclosed in EP 2 479 878 B1, although an unambiguous resonance state and thus problem-free, quasi-resonant and thus low-loss switching (on) of the switching elements can be ensured, the regulating method described does not take account of discontinuities, different gains and nonlinearities of the regulated system that the buck-boost converter may have depending on the ratio of input voltage to output voltage and primarily also in the case of transitions between operating modes. The discontinuities and/or nonlinearities may cause negative effects (e.g., disturbances, oscillations in the regulating circuit) during the regulation of the buck-boost converter. A possible superordinate regulating circuit would therefore have to be of correspondingly slow design, for example, as a result of which dynamic processes, such as input voltage and/or load changes, can be corrected only very slowly.

Furthermore, the document Yaow-Ming, Chen et al. "Progressive smooth transition for four-switch-buck-boost converter in photovoltaic applications", Energy Conversion Congress and Exposition (ECCE), pages 3620-3625, September 2011, discloses a method that describes a transition between different operating modes of a buck-boost converter having four switching elements of a photovoltaic system. Here, depending on the respective operating mode, i.e., buck converter mode, boost converter mode and mixed mode in a corresponding transition region between buck and boost converter modes, and depending on a voltage gain, a predefined value for the respective switched-on duration of the switching elements is predefined with the aid of a table and allows linear regulation to be achieved in the transition region between buck and boost converter modes.

SUMMARY OF THE INVENTION

In view of the foregoing, it is therefore an object of the invention to provide a method for regulating a clocked buck-boost converter which makes possible, in a simple and cost-effective manner, an improvement with respect to the prior art, in particular a rapid and continuous correction of dynamic processes, such as in the case of changes in the input voltage and/or the load or in the case of transitions between different operating modes.

This and other objects and advantages are achieved in accordance with the invention by a method for regulating a clocked buck-boost converter that has two switching elements and an inductance or inductor and via which an input voltage is converted into a regulated output voltage. In this case, a first switching element or buck converter switching element assigned to a buck converter part of the buck-boost converter is clocked by a first control signal and a second switching element or boost converter switching element assigned to a boost converter part of the buck-boost converter is clocked. Here, the first control signal and also the second control signal are derived from a regulator manipulated variable made available by a regulator unit for regulating the output voltage of the buck-boost converter. Further, the regulator manipulated variable defines a switched-on duration of the first switching element and a switched-on duration of the second switching element. For this purpose, for the first control signal a first manipulated variable and for the second control signal a second manipulated variable are generated from the regulator manipulated variable depending on the input voltage and output voltage of the buck-boost converter. For the purpose of generating the first manipulated variable for the first control signal and thus for the purpose of driving the first switching element or the buck converter switching element, the regulator manipulated variable is amplified with a predefinable first gain. For the purpose of generating the second manipulated variable for the second control signal or for the purpose of driving the second switching element or boost converter switching element, a predefinable offset value is subtracted from the regulator manipulated variable and the regulator manipulated variable is amplified with a predefinable second gain. Here, the second gain is maximally equal to or less than the first gain.

The main aspect of the solution proposed in accordance with the invention is that from a regulator manipulated variable determined by a regulator unit based on the output voltage of the buck-boost converter, depending on a respective currently available combination of the input voltage and the output voltage of the buck-boost converter, two manipulated variables are generated, from which the respective control signals for the switching elements of the buck-boost converter can be derived separately from one another and different switched-on durations or switch-off times for the switching elements can thus be defined. That is, depending on the respective input and output voltages of the buck-boost converter, two different control signals for the switching elements are generated such that the buck-boost converter constitutes a regulated system that is as linear as possible for the superordinate regulating circuit for regulating the output voltage. As a result, the regulating circuit or the regulation of the buck-boost converter can ideally be established for the fastest possible response to setpoint changes and disturbances. Dynamic processes, such input voltage and/or load changes, can thus be corrected very rapidly. The method in accordance with the invention and the pulse-width-modulated control signals derivable therefrom for the buck-boost converter advantageously result in a regulated system that is as linear as possible, and thus, in a simple manner, results in a closed-loop regulating circuit that is as fast as possible and whose correction times at different operating points, for different input voltages, output voltages or load situations are largely identical. Integration into a superordinate regulating system is thus facilitated as well.

The two manipulated variables from which the control signals for the respective switching elements are derived also make it possible to achieve a smooth transition between the operating modes, in particular the buck converter mode and the mixed mode, in which a buck-boost converter can be operated depending on the input and output voltages. By virtue of the offset value between first and second manipulated variables, the regulator manipulated variable only has to exceed this value in order that a second control signal for the second switching element or the boost converter switching element is generated and the second switching element begins to switch. Below the offset value, the second switching element and thus the boost converter part of the buck-boost converter remains completely switched off. That means that only the first switching element of the buck converter part undergoes clocking and the buck-boost converter operates in the buck converter mode.

If the regulator manipulated variable has exceeded the offset value, then a second control signal is generated based on the second manipulated variable and the second switching element begins to switch. That is, the buck-boost converter changes from the buck converter mode to the mixed mode, in which both switching elements are switched with different switched-on durations. As the regulator manipulated variable rises, the switched-on durations in the case of the two control signals and thus for the two switching elements are progressively increased, where the switched-on duration of the second switching element or of the boost converter switching element rises more slowly in comparison with the switched-on durations of the first switching element or buck converter switching element on account of the lower gain of the second manipulated variable. The use of the method in accordance with the invention thus makes it possible to change from a buck converter mode to a mixed mode, or from a mixed mode to a buck converter mode, smoothly and continuously depending on a ratio of the input voltage and output voltage of the buck-boost converter.

In order ideally to prevent discontinuities and instabilities in the event of a change between buck converter mode and mixed mode of the buck-boost converter, which may lead to oscillations in the input filter and/or in the case of the input voltage of the buck-boost converter, in the case where the offset value is exceeded by the regulator manipulated variable a derivation of the first manipulated variable from the regulator manipulated variable is altered in such that the switched-on duration for the first switching element is directly reduced. This prevents an abrupt change in the current through the inductance of the buck-boost converter, caused primarily by nonlinear, parasitic capacitances of the switching elements (e.g., field effect transistors). The switched-on duration of the first switching element or of the buck converter switching element can be reduced for example depending on various parameters (e.g., input voltage, and/or output voltage) in order to attain an ideal, continuous transition between buck converter mode and mixed mode.

It is advantageous if the offset value is altered, primarily increased, depending on a difference voltage between the input voltage and the output voltage of the buck-boost converter. Ideally, this alteration can be effected, e.g., by increasing the offset value from zero up to a predefinable maximum value as the difference voltage between input voltage and output voltage rises. The increase can be effected linearly, for example.

What can be achieved in a simple manner by altering the offset value depending on the difference voltage between input voltage and output voltage of the buck-boost converter is that in the case of a high difference voltage between input voltage and output voltage, where the input voltage is greater than the output voltage, the buck-boost converter operates for a longer period (i.e., over a larger output power range) in the buck converter or buck mode. That means that firstly only the first switching element or the buck converter switching element of the buck-boost converter is switched. A change to the mixed mode, i.e., the additional switching of the second switching element or of the boost converter switching element, would occur as a result of a higher offset value only in the case of a higher regulator manipulated variable than in the case of a smaller difference voltage associated with the offset value having a lower value. In the case of a small difference voltage between input voltage and output voltage (i.e., if input voltage and output voltage approximate one another or are almost equal), the, e.g., correspondingly lower offset value is exceeded by the regulator manipulated variable earlier (i.e., already in the case of a smaller output power) and the second switching element or the boost converter switching element begins to switch earlier. That is, the buck-boost converter operates in the mixed mode earlier (i.e., already in the case of a smaller output power) in the case of a small difference voltage between input voltage and output voltage than in the case of a large difference voltage.

Furthermore, it is expedient if the first manipulated variable is limited by a first upper limit and the second manipulated variable is limited by a second upper limit. In this case, for the first upper limit, which upwardly limits the first manipulated variable for deriving the first control signal for the buck converter switching element, a larger value is chosen than for the second upper limit, which limits the second manipulated variable for the second control signal for clocking the boost converter switching element. The predefinable values for the first and second upper limits can be chosen, for example, depending on a predefined or permissible range for the common switching frequency of the two switching elements of the buck-boost converter (e.g., in a predefinable power range). Furthermore, by way of the two upper limits of the first and second manipulated variables, for example, the offset value must also not exceed a predefined maximum value, because otherwise discontinuities would arise in the regulated system.

In addition, it may also be advantageous if the second manipulated variable is limited by a predefinable lower limit. In this case, the predefinable lower limit of the second manipulated variable can be altered, e.g., depending on the difference voltage between the input voltage and the output voltage of the buck-boost converter. In particular, the lower limit for the second manipulated variable can be increased, e.g., from zero up to a predefinable maximum value as a difference between input voltage and output voltage falls. The lower limit can be increased linearly, for example. In this way, for example, even in the case of a small load and a very small difference voltage between input voltage and output voltage, the buck-boost converter or the output voltage can still be regulated. That is, the second switching element or the boost converter switching element begins to undergo clocking ideally already with very short switched-on durations if the output voltage comes close to the input voltage.

Furthermore, it is expedient if the two switching elements of the buck-boost converter are driven and quasi-resonantly switched by the control signals with a common, variable switching frequency. By way of quasi-resonant switching, the two switching elements are switched on simultaneously and with the lowest possible losses. Even in the case of alterations of the input voltage and/or the output voltage or the load, in this case the two switching elements are switched on at a voltage minimum (valley) of the voltage present at the two switching elements and as a result, in a simple manner, relatively low switching losses and also little emitted interference especially at high input and/or output voltages (e.g., 100 to 1000 volts), are attained and a significantly higher efficiency is ensured.

In one expedient embodiment of the method in accordance with the invention, for the predefinable first gain, for the predefinable second gain, for the first upper limit, for the second upper limit and also for a relationship between offset value and difference voltage between input voltage and output voltage, predefined values are chosen such that in a predefinable output power range, the common switching frequency of the switching elements of the buck-boost converter lies in a predefined frequency range. Corresponding predefinition of the first gain and/or of the second gain and also of the first and second upper limits can ensure that the common switching frequency of the two switching elements in the predefinable power range neither exceeds a maximum permissible switching frequency nor falls below a minimum permissible switching frequency. As a result, in a very simple manner, it is possible to prevent high switching losses and, if appropriate, high levels of emitted interference in the case of an excessively high switching frequency and instabilities in the case of the regulator unit or in the regulating circuit in the case of an excessively low switching frequency.

In one preferred embodiment of the method in accordance with the invention, for the purpose of generating the first manipulated variable from the regulator manipulated variable, a gain having a value of one is used as a predefinable first gain. That means that the regulator manipulated variable is largely adopted as the first manipulated variable and is only limited by the predefinable first upper limit to derive therefrom the first control signal for the first switching element or the buck converter switching element.

Furthermore, it may be advantageous if, for the purpose of generating the first control signal for the first switching element from the first manipulated variable and for the purpose of generating the second control signal for the second switching element from the second manipulated variable, a sawtooth signal generated by an oscillator unit is used. For this purpose, the sawtooth signal is compared with the first and second manipulated variables with the aid of two comparator units, for example. In this simple way, two pulse-width-modulated control signals for driving the first and second switching elements of the buck-boost converter can be generated via an oscillator unit and a sawtooth signal.

In one expedient embodiment of the invention, a manipulated variable control unit is used for the derivation of the first manipulated variable and the second manipulated variable from the regulator manipulated variable made available by the regulator unit. That means that a dedicated unit in the form of the manipulated variable control unit can be provided for carrying out the method according to the invention. With the manipulated variable control unit, e.g., based on the regulator manipulated variable made available by the regulator unit and based on input parameters, such as the respective input voltage and the respective output voltage of the buck-boost converter, as output signals the first and second manipulated variables are then made available in order to derive the first and second control signals therefrom. In this case, the manipulated variable control unit can be realized for example as an analog circuit, e.g., with the aid of operational amplifiers.

Alternatively, the manipulated variable control unit can also be configured as a digital circuit, e.g., using a digital signal processor (DSP). Ideally, the functions of the oscillator unit and comparator units, required, e.g., for deriving the control signals from the manipulated variables, are then also realized with the aid of the digital signal processor. As a result, the realization or a circuit arrangement for the implementation of the regulating method in accordance with disclosed embodiments of the invention can be brought about in a simple and cost-effective manner.

In another preferred embodiment of the invention, a voltage regulator with a subordinate current regulation is used as a regulator unit for regulating the output voltage of the buck-boost converter. In particular, average current mode control is used as a regulating method by the regulator unit. In this case, based on an actual value and a setpoint value, e.g., of the output voltage of the buck-boost converter, a voltage regulator predefines for a subordinate current regulator an average current setpoint value, for example, for an average value of a current through the inductance or inductor of the buck-boost converter. With the subordinate current regulator, the current, e.g., through the inductor is then detected indirectly or directly and the manipulated variable is then generated that is used for generating the first and second manipulated variables and thus for deriving the control signals for switching or clocking the switching elements of the buck-boost converter or for determining the switch-off times of the individual switching elements.

Furthermore, it is expedient if the buck-boost converter is operated in a continuous mode and in a discontinuous mode. The buck-boost converter is then switched at an optimum point in time in the discontinuous or discontinuous conduction mode. By contrast, in the case where corresponding overloads are present at the output of the buck-boost converter, the buck-boost converter changes smoothly to the continuous mode in order not to fall below a minimum permissible switching frequency and thus to prevent instabilities at the regulator unit or in the regulating circuit.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWING

The invention is explained below by way of example with reference to the accompanying figures, in which:

FIG. 4 shows an exemplary signal profile for driving switching elements of a buck-boost converter in accordance with the invention.

DETAILED DESCRIPTION OF THE EXEMPLARY EMBODIMENTS

Figure 1:
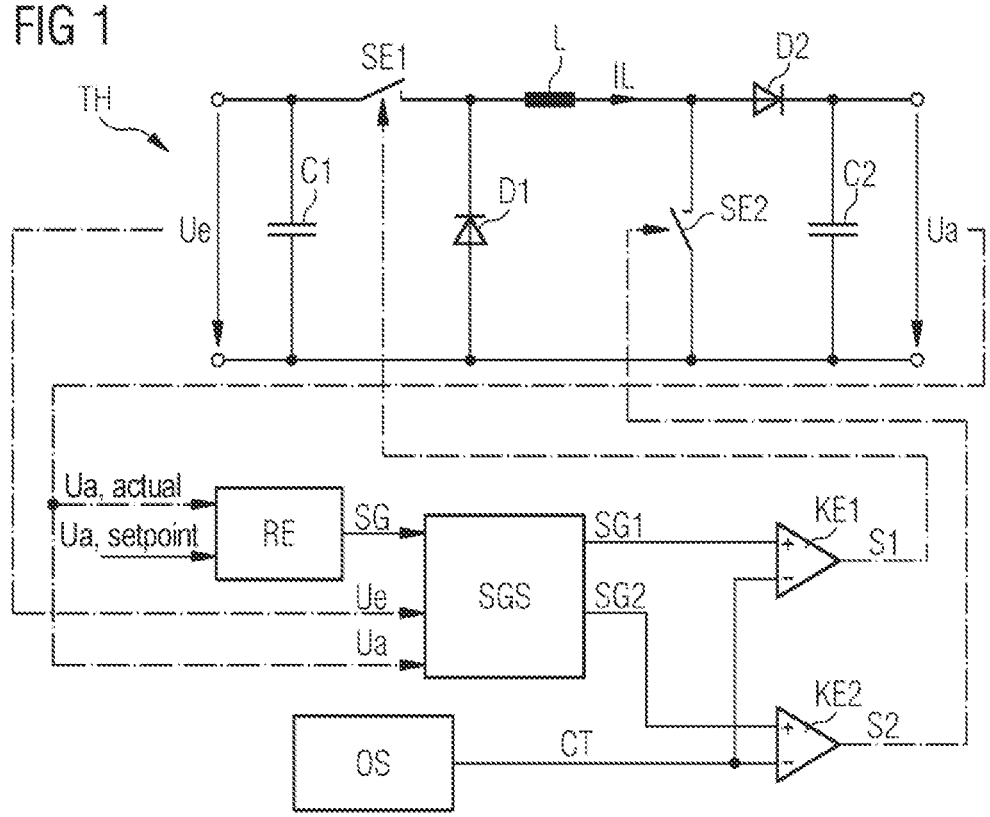
FIG. 1 shows schematically an exemplary system for implementing the method in accordance with the invention for regulating a DC-DC converter, in particular buck-boost converter.

FIG. 1 shows schematically an exemplary system for performing the method in accordance with the invention for regulating a clocked buck-boost converter TH. The buck-boost converter TH can convert an input voltage Ue into a regulated output voltage Ua that is greater than, equal to or less than the input voltage Ue. For this purpose, the buck-boost converter TH can be operated in different operating modes, such as in a buck converter mode and/or a mixed mode, depending on a ratio between input voltage Ue and output voltage Ua.

A buck-boost converter TH (as illustrated by way of example in an upper part of FIG. 1) comprises a buck converter with a boost converter connected downstream thereof. An input capacitance C1 is usually provided on the input side, where the input voltage Ue is present at the input capacitance. Like the output voltage Ua, the input voltage Ue is related to the same reference potential. Furthermore, an exemplary circuit arrangement of a buck-boost converter TH comprises an inductance L, or an inductor L, connected to the input voltage Ue via a first switching element SE1, which may also be referred to as buck converter switching element SE1. A connection between the inductance L and the first switching element SE1 and the reference potential comprises a first diode D1, which becomes conducting when the buck converter switching element SE1 is switched off.

On the output side, the inductance L, through which an inductor current $I_L$ flows, is connected to an output of the buck-boost converter TH via a second diode D2. A connection between the inductance L and the second diode D2 is connected to the reference potential via a second switching element SE2, which may also be referred to as boost converter switching element SE2. Furthermore, an output capacitance C2 is provided on the output side.

The two switching elements SE1, SE2 of the buck-boost converter TH are driven by pulse-width- and frequency-modulated control signals S1, S2 with a common, variable switching frequency and can be switched quasi-resonantly, for example. That is, the two switching elements SE1, SE2 are switched on simultaneously at a voltage minimum (valley) of the voltage present at the switching elements SE1, SE2. A switched-on duration of the respective switching element SE1, SE2 can be predefined by a corresponding control signal S1, S2. In this case, a first control signal S1 is used for driving the first switching element SE1 or the buck converter switching element SE1 and a second control signal S2 is used for driving the second switching element SE2 or the boost converter switching element SE2.

For deriving the pulse-width- and frequency-modulated control signals S1, S2, use is made of a regulating circuit for regulating the output voltage Ua,actual to a predefinable setpoint value Ua,setpoint, which is illustrated by way of example and schematically in a lower part of FIG. 1. In this case, for example, average current mode control is used as a regulating method. A regulator unit RE configured, e.g., as a voltage regulator with a subordinate current regulation is used for this purpose. In this case, an average current setpoint value, for example<for an average value of a current through the inductor of the buck-boost converter, is predefined for a subordinate current regulator by a voltage regulator, e.g., based on a predefinable setpoint value Ua,setpoint and a present output voltage Ua,actual of the buck-boost converter TH. The subordinate current regulator then indirectly or directly detects a current, such as the current $I_L$ through the inductor L, and determines a regulator manipulated variable SG therefrom. The regulator manipulated variable defines the respective switched-on duration of the first and second switching elements SE1, SE2 because the regulator manipulated variable is used for deriving the control signals S1, S2 for switching or clocking the switching elements SE1, SE2 of the buck-boost converter.

With a manipulated variable control unit SGS, respective dedicated manipulated variables SG1, SG2 for the first and second switching elements SE1, SE2 of the buck-boost converter TH can then be derived from the regulator manipulated variable SG depending on the input voltage Ue and the output voltage Ua. To that end, for the purpose of generating a first manipulated variable SG1 for deriving the first control signal S1, the regulator manipulated variable SG is amplified with a predefinable first gain. By way of example, a gain having a value of one can be used as the predefinable first gain. As a result, the regulator manipulated variable SG is adopted, for example, as the first manipulated variable SG1 largely without alteration.

For the purpose of generating a second manipulated variable SG2 for deriving the second control signal S2, an offset value is subtracted from the regulator manipulated variable SG and the regulator manipulated variable SG is amplified with a predefinable second gain. In this case, a gain that is maximally equal to, but usually less than, the predefinable first gain for generating the first manipulated variable SG1 is chosen as a predefinable second gain.

The predefinable first gain and the predefinable second gain can be chosen, for example, such that in a predefinable power range, the common, variable switching frequency of the switching elements SE1, SE2 of the buck-boost converter TH lies in a predefined range. By way of example, the first and second gains can be chosen such that in the predefinable power range, the switching frequency neither exceeds a maximum permissible switching frequency nor falls below a minimum permissible switching frequency.

The manipulated variable control unit SGS can be formed, for example, as an analog circuit, e.g., using operational amplifiers. Alternatively, the manipulated variable control unit SGS can be realized as a digital circuit, e.g., with a digital signal processor.

For example, the switched-on duration or a switch-off time of the respective switching element SE1, SE2 of the buck-boost converter TH is then defined by the manipulated variable SG made available by the regulator unit RE, or by the manipulated variables SG1, SG2 derived therefrom. In this regard, e.g., the first manipulated variable SG1 can predefine the switched-on duration or a switch-off time of the first switching element SE1 or the buck converter switching element SE1. The second manipulated variable SG2 can predefine, e.g., the switched-on duration or a switch-off time for the second switching element SE2 or the boost converter switching element SE2.

In order to attain the two pulse-width- and frequency-modulated control signals S1, S2, primarily the different switched-on durations or switch-off times of the two switching elements SE1, SE2, from the manipulated variables SG1, SG2 predefined by the manipulated variable control unit SGS, the respective manipulated variable SG1, SG2 is compared with a sawtooth signal CT, for example. This can be done, e.g., with the aid of comparator units KE1, KE2. The sawtooth signal CT can be generated, for example, by an oscillator unit OS (e.g., sawtooth generator). The two comparator units KE1, KE2 then supply e.g. indirectly or directly the pulse-width- and frequency-modulated control signals S1, S2, with which the two switching elements SE1, SE2 are then switched. In the case of a digital realization of the manipulated variable control unit SGS, e.g., with the aid of a digital signal processor, the function of the oscillator unit OS and the functions of the comparator units KE1, KE2 can ideally also be realized with the aid of the digital signal processor.

Figure 2:
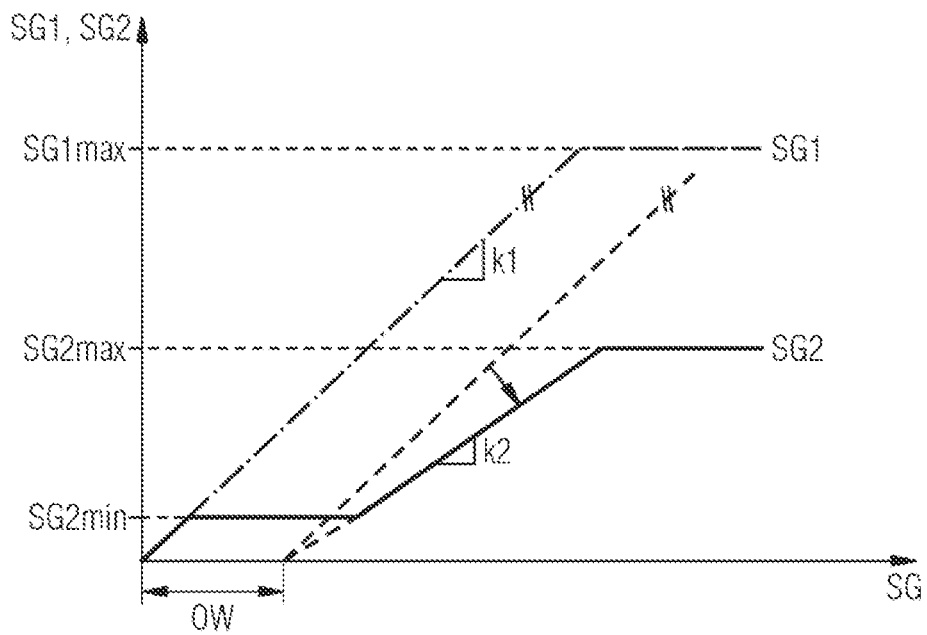
FIG. 2 shows an exemplary relationship between the first and second manipulated variables and the regulator manipulated variable in accordance with the method in accordance with the invention for regulating a buck-boost converter.

FIG. 2 illustrates schematically and an exemplary relationship or a profile of the first manipulated variable SG1 and of the second manipulated variable SG2 as output signal of the manipulated variable control unit SGS with the regulator manipulated variable SG as input signal of the manipulated variable control unit SGS for a combination of input voltage Ue and output voltage Ua. For this purpose, the regulator manipulated variable SG is plotted on a horizontal axis (x-axis). Corresponding values of the first manipulated variable SG1 and respectively the second manipulated variable SG2 can be read on a vertical axis (y-axis).

The exemplary profile of the first manipulated variable SG1 used for deriving the first control signal S1 begins, for example, at a point of intersection of the two axes and progresses in the form of a straight line having a gradient k1. In this case, the gradient k1 of the straight line, corresponding to a predefinable first gain k1 of the regulator manipulated variable SG, can have, e.g., the value 1. That means that the regulator manipulated variable with a first gain of, for example, 1, i.e. largely unaltered, is adopted as the first manipulated variable SG1. In this case, the first manipulated variable SG1 is only limited by a predefinable first upper limit SG1max. The first upper limit SG1max can be chosen, e.g., such that in the predefinable power range, the switching frequency of the two switching elements SE1, SE2 lies in a predefined frequency range.

The exemplary profile of the second manipulated variable SG2 shows that the second manipulated variable SG2 is shifted by an offset value OW along the positive x-axis. The offset value OW is subtracted from the regulator manipulated variable SG in order to attain the second manipulated variable SG2. This is illustrated by way of example by a parallel shift along the x-axis of the profile of the first manipulated variable (SG1) in the form of a dashed straight line. The offset value OW can be linearly altered, e.g., increased or enlarged, for example, depending on a difference voltage between the input voltage Ue and the output voltage Ua of the buck-boost converter TH. In this case, e.g., in the case of a high difference voltage between input and output voltages Ue, Ua, the offset value OW can be greater than in the case of a small difference voltage. That is, when there is a large difference between input and output voltages Ue, Ua, the profile of the second manipulated variable SG2 is shifted along the x-axis further toward the right relative to the profile of the first manipulated variable SG1 compared with when there is a small difference. For the operation of the buck-boost converter TH, this means that in the case of a high difference voltage, e.g., as a result of a large input voltage Ue, the buck-boost converter TH operates for a longer period (i.e., over a larger output power range) in the buck converter or buck mode until a change to the mixed mode takes place. In the case of a small difference between input and output voltages Ue, Ua, the second switching element SE2 or the boost converter switching element SE2, in addition to the first switching element SE1 or the buck converter switching element SE1, begins to undergo clocking earlier (i.e., already in the case of a smaller output power).

Furthermore, the regulator manipulated variable SG is amplified with a predefinable second gain k2 corresponding to a gradient k2 of the profile of the second manipulated variable SG2. The predefinable second gain k2 is chosen to be smaller, for example, than the predefinable first gain k1. Accordingly, the profile of the second manipulated variable SG2 has a smaller gradient k2 than the parallel shifted profile of the first manipulated variable SG1. In the case where a first gain k1 of, e.g., one is chosen, a value of less than one can be chosen for the second gain k2, e.g., depending on the permissible or predefined range for the switching frequency of the two switching elements SE1, SE2, in the predefinable power range. The second gain k2 can be maximally equal to or less than the first gain k1.

Furthermore, the second manipulated variable SG2 is also upwardly limited by a second upper limit SG2max. The second upper limit SG2max can, e.g., likewise be chosen such that in the predefinable power range, the switching frequency of the two switching elements SE1, SE2 lies in a predefined range. Furthermore, the second manipulated variable SG2 is downwardly limited by a predefinable lower limit SG2min in order for the buck-boost converter TH to remain regulable even in the case of a small load and a very small difference voltage between input and output voltages Ue, Ua. In this case, the predefinable lower limit SG2min can be altered, for example, depending on the difference voltage between input and output voltages Ue, Ua of the buck-boost converter TH and can be increased linearly from zero up to a predefinable maximum value, e.g., as the difference between input and output voltages Ue, Ua falls. That is, the second switching element SE2 or the boost converter switching element SE2 begins to undergo clocking ideally in the case of a small difference voltage between input voltage and output voltage in the case of a small output power already with very short switched-on durations if the output voltage Ua comes close to the input voltage Ue.

Upon transition between the buck converter mode and the mixed mode, discontinuities and instabilities can occur during the regulation, and can lead, for example, to oscillations in the input filter and/or in the case of the input voltage Ue of the buck-boost converter TH. In order to prevent this, for example, in the case where the offset value OW is exceeded by the regulator manipulated variable SG, a derivation of the first manipulated variable SG1 from the regulator manipulated variable SG can be adapted by means of simple compensation variants in such a way that a switched-on duration of the first switching element SE1 or of the buck converter switching element SE1 is directly reduced. An abrupt change in the current $I_L$ through the inductance L of the buck-boost converter TH, caused in particular by nonlinear parasitic capacitances of the switching elements SE1, SE2 (e.g., field effect transistors), is prevented in this way.

Figure 3A:
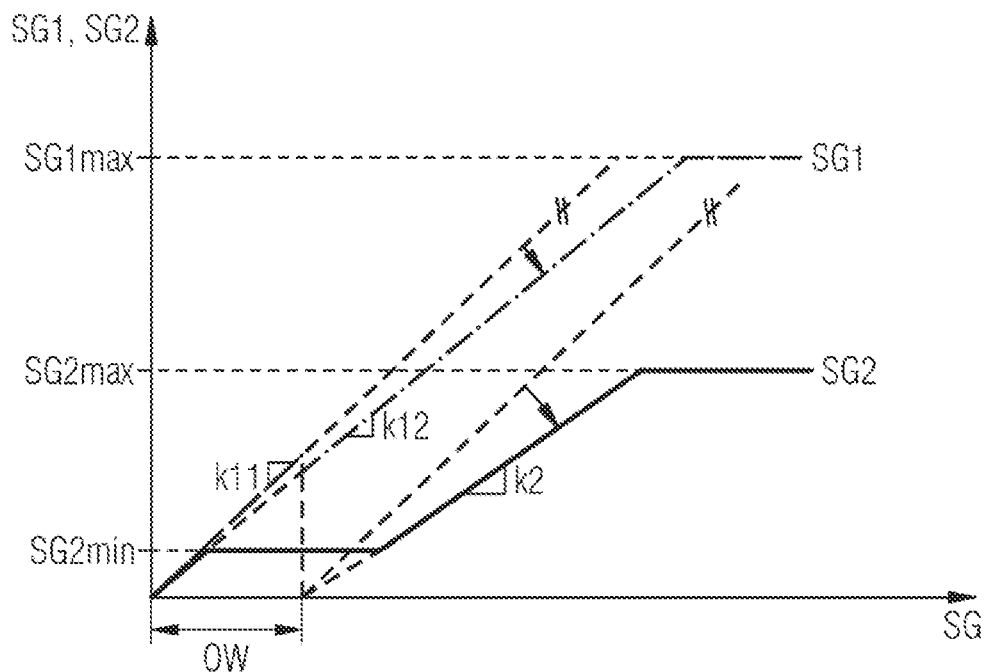
FIG. 3a shows an exemplary relationship between the first and second manipulated variables and the regulator manipulated variable with reduction of a switch-on time of the buck converter switching element upon transition between buck converter mode and mixed mode via scaling.
Figure 3B:
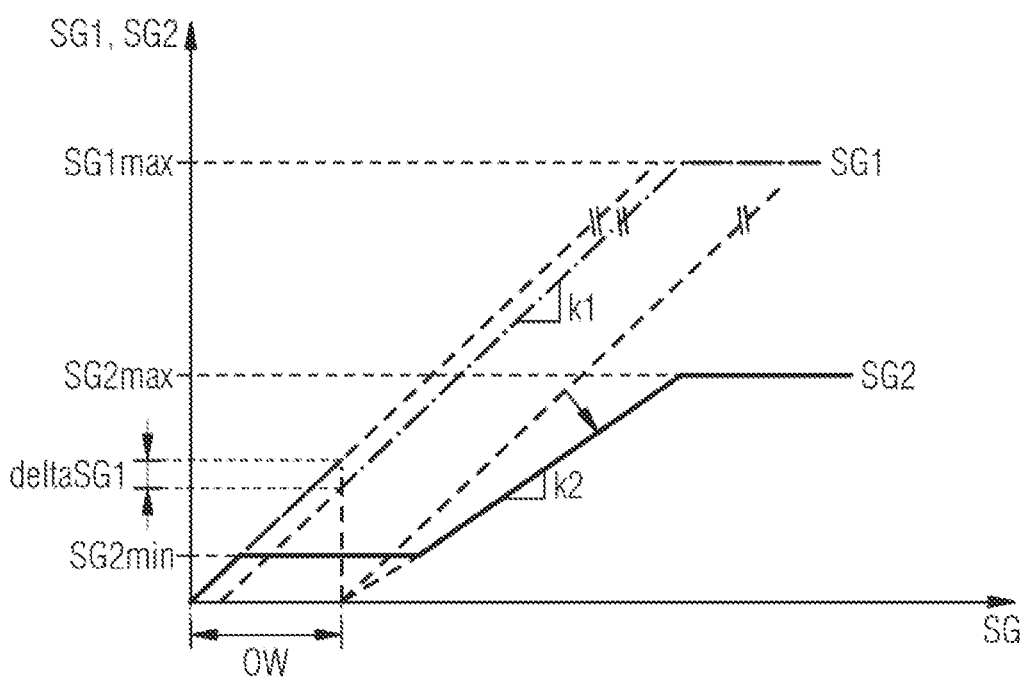
FIG. 3b shows an exemplary relationship between the first and second manipulated variables and the regulator manipulated variable with constant reduction of the switch-on time of the buck converter switching element upon transition between buck converter mode and mixed mode.

Simple compensation variants are illustrated by way of example and schematically based on the relationship between the first and second manipulated variables SG1, SG2 and the regulator manipulated variable SG in FIGS. 3a and 3b.

FIG. 3a once again shows the relationship between the first manipulated variable SG1 and the second manipulated variable SG2, which are plotted on the vertical axis, and the regulator manipulated variable SG, which is plotted on the horizontal axis, where upon entry into the mixed mode, the switched-on duration of the first switching element SE1 is reduced, for example, via the scaling of the manipulated variable SG1.

In FIG. 3a, the second manipulated variable SG2 is illustrated without any alteration relative to the relationship with the regulator manipulated variable illustrated by way of example in FIG. 2. That is, the second manipulated variable SG2 once again has the second upper limit SG2max and the lower limit SG2min. The second manipulated variable SG2 is shifted by the offset value OW relative to the first manipulated variable SG1 and has a predefinable second gain k2 corresponding to a gradient k2 of the profile of the second manipulated variable SG2.

The first manipulated variable SG1 is once again limited by the first upper limit SG1max. Until the regulator manipulated variable SG reaches the offset value OW, the gradient or the gain of the first manipulated variable SG1 has a first gradient or gain value of k11 (e.g., one). As soon as the regulator manipulated variable SG exceeds the offset value OW, i.e., the buck-boost converter TH changes from the buck converter mode to the mixed mode, downscaling of the first manipulated variable SG1 is effected. That is, the gradient or the gain of the first manipulated variable is altered to a second gradient or gain value k12, which is less than the first gradient or gain value k11. In FIG. 3a, this is illustrated by way of example by a deviation of the first manipulated variable profile SG1 from the original manipulated variable profile (illustrated in a dashed manner) of the first manipulated variable SG1. This downscaling of the first manipulated variable SG1 causes an alteration of the first control signal S1 and thus a reduction of the switched-on duration of the first switching element SE1, which can take effect directly upon the change to the mixed mode. As a result of the compensation variant of scaling, the first manipulated variable SG1 has a smaller gradient or gain k12, for example, in the mixed mode than in the buck converter mode. Depending on the respective offset value OW, which can be altered linearly depending on a difference between input voltage Ue and output voltage Ua of the buck-boost converter, the switched-on duration of the first switching element SE1 or of the buck converter switching element can decrease by different values upon entry into the mixed mode.

FIG. 3b also shows the relationship between the first manipulated variable SG1 and the second manipulated variable SG2, which are plotted on the vertical axis, and the regulator manipulated variable SG, which is plotted on the horizontal axis. In this case, however, when the regulator manipulated variable SG reaches the offset value OW, the switched-on duration of the first switching element SE1 or of the buck converter switching element is reduced by a constant value deltaSG1. In FIG. 3b, the second manipulated variable SG2 is also once again unaltered by comparison with FIG. 2. That is, the second manipulated variable SG2 once again has the second upper limit SG2max and the lower limit SG2min and is shifted by the offset value OW relative to the first manipulated variable SG1. Furthermore, the second manipulated variable once again has the predefinable second gain k2 corresponding to the gradient k2 of the profile of the second manipulated variable SG2.

The first manipulated variable SG1, which once again is limited by the first upper limit SG1max, has a profile having the gradient k1 corresponding to the predefinable first gain. For a compensation, the constant value deltaSG1 is subtracted from the first manipulated variable SG1 as soon as the regulator manipulated variable SG exceeds the offset value OW, i.e., the buck-boost converter TH changes from the buck converter mode to the mixed mode. Subtraction of the constant value deltaSG1 alters the first manipulated variable SG1 and the first control signal S1 derived therefrom. This results in a rapid or immediate reduction of the switched-on duration of the first switching element SE1 or of the buck converter switching element SE1. In FIG. 3b, this reduction is illustrated by way of example by a parallel shift of the profile of the first manipulated variable SG1 by the constant value deltaSG1 in the direction of the horizontal axis (i.e., downward) starting from when the regulator manipulated variable SG reaches the offset value OW. Subtracting the constant value deltaSG1 results in a constant reduction of the switched-on duration of the first switching element SE1 upon entry into the mixed mode independently of the respective present offset value OW.

FIG. 4 illustrates schematically and by way of example based on signal profiles how the first and second control signals S1, S2 for driving the two switching elements SE1, SE2 of the buck-boost converter TH are derived from the first and second manipulated variables SG1, SG2, respectively, which are made available, e.g., at the output of the manipulated variable control unit SGS via the method in accordance with the invention.

A first signal profile CT shows a temporal profile of the sawtooth signal CT, where this profile is generated, e.g., by the oscillator unit OS. Furthermore, the first manipulated variable SG1 and the second manipulated variable SG2 are plotted in the first signal profile CT, which manipulated variables (as illustrated, e.g., in FIG. 2, FIG. 3a or FIG. 3b) are determined from the regulator manipulated variable SG depending on the respective input and output voltages Ue, Ua of the buck-boost converter TH.

A second signal profile S1 shows a temporal profile of the first control signal S1, which drives the first switching element SE1 or the buck converter switching element SE1.

A third signal profile S2 shows a temporal profile of the second control signal S2, which drives the second switching element SE2 or the boost converter switching element SE2.

The first manipulated variable SG1, which is always above the second manipulated variable SG2 on account of the greater first gain k1, and the second manipulated variable SG2 are compared with the sawtooth signal CT, for example, with the aid of the two comparator units KE1, KE2. The first control signal S1 for the buck converter switching element SE1 and the second control signal S2 for the boost converter switching element SE2 are generated as a result, the two control signals S1, S2 having the same period duration T. The two control signals are set (at the same switch-on time as evident from the second and third signal profiles S1, S2), e.g., via quasi-resonant switching. However, the two control signals S1, S2 are reset after switched-on durations $T_{e1}$, $T_{e2}$ of different lengths depending on the respective manipulated variable SG1, SG2 or the amplitudes thereof. If the sawtooth signal CT exceeds the second manipulated variable SG2, which has the lower value on account of the smaller second gain k2, then the control signal S2 (as illustrated by way of example in the third signal profile S2) is reset after the switched-on duration $T_{e2}$ of the second switching element or of the boost converter switching element SE2. If the rising sawtooth signal CT then reaches the value of the first manipulated variable SG1, then the first control signal S1 is also reset and the first switching element or the buck converter switching element SE1 is switched off after the switched-on duration Te1.

Thus, the boost converter switching element SE2 is furthermore switched on only if the buck converter switching element SE1 is also switched on. If the regulator manipulated variable SG does not exceed the predefinable offset value dependent on the difference between input and output voltages Ue, Ua of the buck-boost converter TH, then the second manipulated variable SG2 is zero and only the buck converter switching element SE1 by itself undergoes clocking or the buck-boost converter operates in the buck converter or buck mode.

Figure 5:
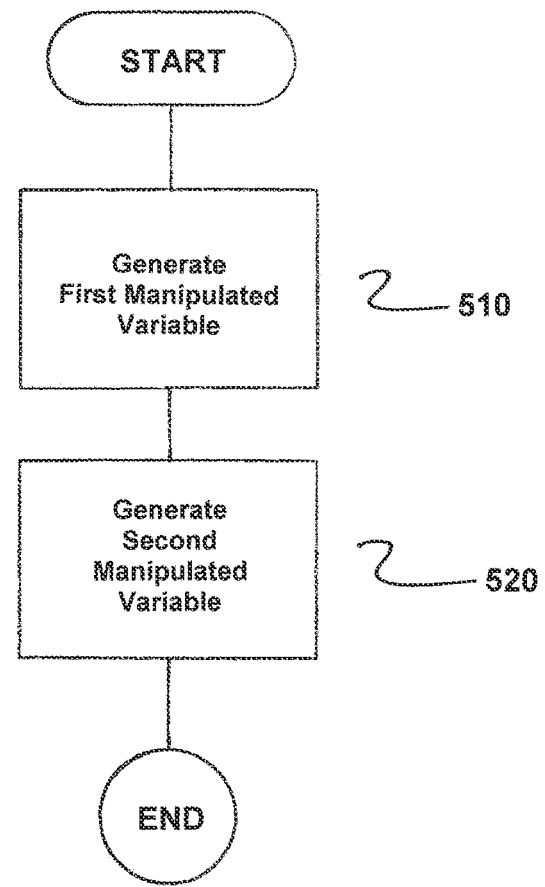
FIG. 5 is a flowchart of the method in accordance with the invention.

FIG. 5 is a flowchart of the method for regulating a buck boost converter TH that has two switching elements SE1, SE2 and an inductance and via which an input voltage Ue is converted into a regulated output voltage Ua, where a first switching element SE1 or buck converter switching element SE1 is clocked by a first control signal S1 and a second switching element SE2 or boost converter switching element SE2 is clocked by a second control signal S2, and the first control signal S1 and the second control signal S2 are derived from a regulator manipulated variable SG made available by a regulator unit (RE) and defining a switched-on duration Tel for the first switching element SE1 and a switched-on duration Tet for the second switching element SE2.

The method comprises generating a first manipulated variable SG1 for deriving the first control signal S1, as indicated in step 510.

Next, a second manipulated variable SG2 for deriving the second control signal S2 from the regulator manipulated variable SG depending on the input voltage Ue and output voltage Ua of the buck-boost converter TH is generated, as indicated in step 520. Here, the regulator manipulated variable SG is amplified with a predefinable first gain k1 to generate the first manipulated variable SG1, an offset value OW is subtracted from the regulator manipulated variable SG and the regulator manipulated variable SG is amplified with a predefinable second gain k2 to generate the second manipulated variable SG2.

In accordance with the invention, the predefinable second gain k2 is maximally equal to or less than the predefinable first gain k1.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for regulating a buck-boost converter which has two switching elements and an inductance and via which an input voltage is converted into a regulated output voltage, a first switching element or buck converter switching element being clocked by a first control signal and a second switching element or boost converter switching element being clocked by a second control signal, and the first control signal and the second control signal being derived from a regulator manipulated variable made available by a regulator unit and defining a switched-on duration for the first switching element and a switched-on duration for the second switching element, generating a first manipulated variable for deriving the first control signal; and generating a second manipulated variable for deriving the second control signal from the regulator manipulated variable depending on the input voltage and output voltage of the buck-boost converter, the regulator manipulated variable being amplified with a predefined first gain to generate the first manipulated variable, an offset value being subtracted from the regulator manipulated variable and the regulator manipulated variable being amplified with a predefined second gain to generate the second manipulated variable;

wherein the predefined second gain is maximally equal to or less than the predefined first gain; and wherein the offset value is altered depending on a difference voltage between the input voltage and the output voltage of the buck-boost converter.

2. The method as claimed in claim 1, wherein in cases in which the offset value is exceeded by the regulator manipulated variable, a derivation of the first manipulated variable from the regulator manipulated variable is altered such that a switched-on duration for the first switching element is directly reduced.

3. The method as claimed in claim 2, wherein the offset value is altered depending on a difference voltage between the input voltage and the output voltage of the buck-boost converter.

4. The method as claimed in claim 1, wherein the offset value is increased from zero up to a predefined maximum value as a difference voltage between input voltage and output voltage rises.

5. The method as claimed in claim 1, wherein the first manipulated variable is limited by a first upper limit and the second manipulated variable is limited by a second upper limit.

6. The method as claimed in claim 1, wherein the second manipulated variable is limited by a predefined lower limit.

7. The method as claimed in claim 1, wherein the two switching elements of the buck-boost converter are driven and quasi-resonantly switched by the control signals with a common, variable switching frequency.

8. The method as claimed in claim 1, wherein for the predefined first gain, for the predefined second gain, for a first upper limit, for a second upper limit and also for a relationship between offset value and difference voltage between input voltage and output voltage, predefined values are selected such that in a predefined output power range, the common switching frequency of the switching elements of the buck-boost converter lies in a predefined frequency range.

9. The method as claimed in claim 1, wherein a gain having a value of one is utilized as a predefined first gain to generate the first manipulated variable from the regulator manipulated variable.

10. The method as claimed in claim 1, wherein in order to generate the first control signal for the first switching element from the first manipulated variable and to generate the second control signal for the second switching element from the second manipulated variable, a sawtooth signal generated by an oscillator unit is utilized.

11. The method as claimed in claim 1, wherein a manipulated variable control unit is provided for the derivation of the first manipulated variable and the second manipulated variable from the regulator manipulated variable made available by the regulator unit.

12. The method as claimed in claim 11, wherein the manipulated variable control unit is realized as an analog circuit aided by operational amplifiers.

13. The method as claimed in claim 11, wherein the manipulated variable control unit is realized as a digital circuit aided by a digital signal processor.

14. The method as claimed in claim 1, wherein a voltage regulator with a subordinate current regulation is utilized as a regulator unit for regulating the output voltage of the buck-boost converter.

15. The method as claimed in claim 1, wherein the buck-boost converter is operated in a continuous mode and in a discontinuous mode.

* * * * *